Sept. 26, 1944.   W. J. ANDRES   2,358,846
GEAR SHIFTING MECHANISM
Filed July 29, 1940   3 Sheets-Sheet 3

Inventor
William J. Andres
By N. D. Parker Jr.
Attorney

Patented Sept. 26, 1944

2,358,846

UNITED STATES PATENT OFFICE 2,358,846

GEAR SHIFTING MECHANISM

William J. Andres, Pittsburgh, Pa., assignor to Bendix-Westinghouse Automotive Air Brake Company, Pittsburgh, Pa., a corporation of Delaware Application July 29, 1940, Serial No. 348,299

20 Claims. (Cl. 74—472)

This invention relates to gear shifting mechanism and more particularly to apparatus for controlling the operation of such mechanism.

The control apparatus of the present invention is particularly adapted to use with transmissions which are connected with the engine or vehicle motor through a clutch having a clutch brake acting on the clutch member which is connected to the transmission and is especially adaptable to such mechanisms in cases where the clutch used is of the so-called fluid flywheel type which is not completely disengageable but continues to transmit a certain amount of power to the transmission from the engine even when the engine is running at idling speed. The use of clutch brakes in connection with the driven member of a vehicle clutch in order to facilitate gear shifting is well known, and it is also well known that, while such brakes are effective in facilitating a gear shift when shifting from a lower to a higher gear ratio, they have a detrimental effect on the shifting of the gears from a higher to a lower speed, and it is consequently evident that clutch brakes of this type must be selectively operated or not operated depending on the particular change in gear ratio desired.

Since the adoption of the fluid flywheel on a considerable number of vehicles, the use of a clutch brake has become especially desirable in facilitating changes of gear ratio, and is particularly desirable and even essential in connection with transmissions of the type having a lockout mechanism for preventing shifting of the gears from neutral position to gear engaged position which is operable in response to a change in the relative direction of rotation of the input and output shafts of the transmission to permit such gear engagements, as the inherent drag of a fluid flywheel when the vehicle engine is running at idling speed and the vehicle is stationary renders it impossible to obtain a reversal of the relative direction of rotation of the input and output shafts in order to permit gear engagement unless additional means are provided to overcome the torque exerted on the input shaft by the fluid flywheel under such conditions, and to this end such clutch mechanisms are now provided with a clutch brake which not only stops the rotation of the driven member of the clutch, but also in some cases reverses the direction of motion of the input shaft when the vehicle is stationary.

It is accordingly an object of the present invention to provide means for controlling the actuation of a clutch brake of the above character when the conditions of vehicle operation require the use of the brake.

Another object of the invention is to provide means for automatically controlling a clutch brake of the foregoing type in response to the operation of the vehicle engine under varying conditions.

A still further object includes the provision of novel interlocking mechanisms for preventing automatic operation of the clutch brake when the gears of the transmission are in engaged position.

Still another object comprehends the use of an operator controlled device for controlling the operation of the clutch brake to facilitate the change of gear ratio regardless of the conditions of engine operation or the position of the transmission gears.

Yet another object is to provide mechanism for preventing the selection and engagement of certain gear ratios until the clutch brake has been applied under the control of the operator controlled means.

Other objects and novel features of the invention will appear more fully hereinafter from a consideration of the following detailed description when taken in connection with the accompanying drawings, wherein one embodiment of the invention is illustrated. It is to be expressly understood, however, that the drawings are not designed as a definition of the limits of the invention, reference being had to the appended claims for this purpose.

In the drawings, wherein similar reference characters refer to like parts throughout the several views.

Figure 1:
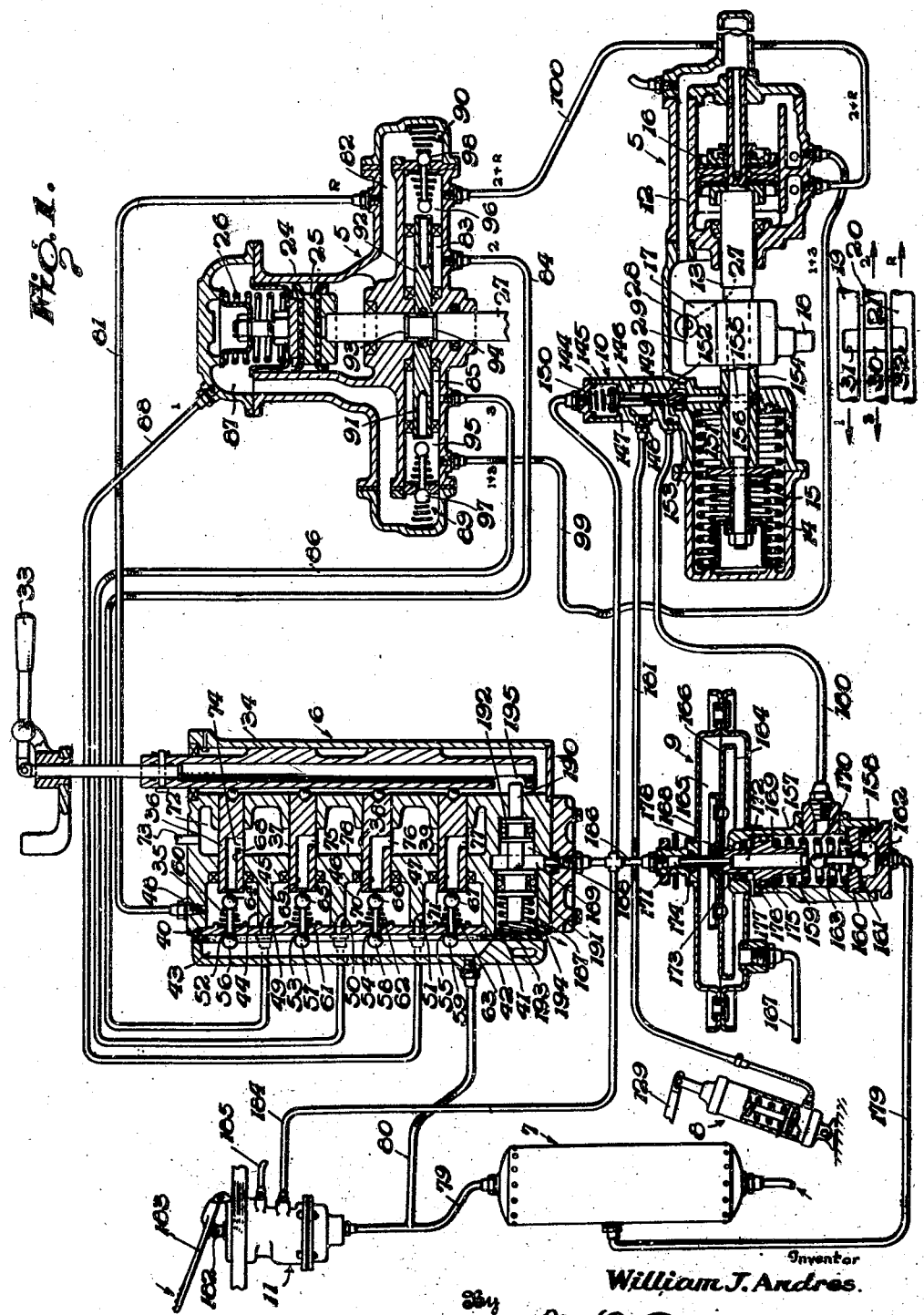
Fig. 1 is a diagrammatic views, partially in section, of a gear shifting mechanism and clutch brake controlling mechanism constructed in accordance with the principles of the present invention.

Referring more particularly to Fig. 1, the present invention is illustrated therein in connection with a fluid pressure operated gear shifting mechanism adapted for use with any suitable type of transmission to establish various gear ratios, and, with the exception of certain additional control mechanism which is part of the present invention, this gear shifting apparatus is similar to that disclosed in the application for U. S. Letters Patent of Roy S. Sanford et al., Serial No. 268,982, filed April 20, 1939, and reference will be had to the disclosure of the above application for a more complete description of the gear shifting mechanism shown in Fig. 1 of the instant application.

As illustrated in Fig. 1, the present invention includes a fluid pressure operated gear shifting mechanism 5 for shifting the transmission gears, a manually operable control valve mechanism 6 for controlling the supply of fluid pressure to the gear shift mechanism for selecting and establishing desired gear ratios, a fluid pressure reservoir 7 for supplying fluid pressure for the operation of the gear shift and the other mechanism hereinafter described, a fluid motor 8 for actuating a clutch brake, a control valve 9 actuated by the pressure in the intake manifold of the engine, not shown, for controlling the operation of fluid motor 8, a control valve 10 operated by movement of the gear shift for further controlling the flow of fluid pressure to the fluid motor 8 and a manually operable valve 11 for independently controlling the operation of the fluid motor.

As shown in the drawings, the fluid pressure operated gear shifting mechanism includes a double acting fluid pressure actuator 12 having a piston rod 13 normally held in neutral position as by means of preloaded springs 14 and 15 and adapted on admission of fluid pressure to either side of piston 16 to move piston rod 13 in either direction from neutral position. A gear shifting element 17 is mounted on the piston rod for longitudinal movement therewith, as well as for rotational movement thereon, and may be oscillated about said rod to cause the finger 18 formed on the lower end of the element to engage any one of the shift rails 19, 20 and 21, which in turn are connected to the various transmission gears to be shifted through the usual shift forks carried thereby, such as shift fork 22 shown in Fig. 2 of the drawings. As shown diagrammatically, the oscillating motion of the element 17 for selecting the various shift rails is controlled by a fluid pressure actuator 24 having a piston 25 normally held in neutral position by preloaded spring 26 and connected to the gear shifting element through a piston rod 27, connected at one end to the piston 25 and at the other end to the element 17 by means of the engagement of a slot 28 formed in the piston rod with a tooth-like portion 29 formed on the upper portion of the element 17. The neutralizing spring 26 is so arranged that the portion 18 of the element 17 normally engages a slot 30 in the shift rail 20, and it will be readily apparent that, on admission of fluid under pressure to the right side of the piston 16 of the actuator 12, the shift rail 20 will be moved to the left, to engage third speed, while the application of fluid pressure to the left end of the piston will move the shift rail 20 to the right to engage second speed. In like manner, it will be understood that, on admission of fluid pressure to the upper side of the piston 25, the shifting element 17 will be rotated about the piston rod 13 to cause engagement of the portion 18 with a slot 31 formed in the shift rail 19 so that admission of fluid under pressure to the right side of the piston 16 will move the element 17 and the shift rail 19 to the left to engage first speed. Admission of fluid pressure to the lower side of piston 25 will, on the other hand, oscillate the element 17 to effect engagement thereof with the slot 32 of shift rail 21, and subsequent application of fluid under pressure to the left side of piston 16 will shift the element as well as the rail 21 to the right to effect engagement of reverse gear.

The application of fluid pressure from the reservoir 7 to the fluid actuators 12 and 24 is initially controlled by the operation of the control valve mechanism 6, an operator controlled gear shift lever 33 being provided and adapted to impart both sliding and rotating movement to a cam shaft 34 mounted in valve body 35 for selective actuation of valve operating plungers 36, 37, 38 and 39, these plungers being slidably mounted in the body 35 for selectively controlling the flow of fluid pressure to and from the fluid pressure actuators 12 and 24 of the gear shifting mechanism 5. A partition 40 is provided at the left side of the valve body 35, being held in position by means of a gasket 41 and a cover plate 42 and forming in connection with said cover plate and the casing 35 an inlet chamber 43 on the left side of the partition and on the right side a series of outlet chambers 44, 45, 46 and 47, provided with outlet ports 48, 49, 50 and 51 respectively. A series of inlet ports 52, 53, 54 and 55 are provided in the partition to connect the inlet chamber 43 with the above outlet chambers respectively, and these ports are normally closed by means of valve members 56, 57, 58 and 59, these valve members having portions formed on the left end normally held in engagement with said ports by means of springs 60, 61, 62 and 63 interposed between the right hand ends of the valve members and the right side of the partition 40. The right ends of the aforesaid valves have portions 64, 65, 66 and 67 formed thereon and adapted to respectively sealingly engage the left ends of bores 68, 69, 70 and 71, formed respectively in the slidable valve actuating plungers 36, 37, 38 and 39. An exhaust chamber 72 is formed in the right hand portion of the casing 35 having an exhaust port 73 connecting the chamber with atmosphere and is adapted to exhaust air from the outlet chambers 44, 45, 46 and 47 through the plunger bores 68, 69, 70 and 71, by virtue of their connection with the outlet chamber through intersecting ports 74, 75, 76 and 77 formed in the respective plungers and in communication with the exhaust chamber 72. The four valve operating plungers are slidably received by a partition 78 formed in the housing which effectively prevents the passage of fluid pressure from the outlet chambers to the exhaust chamber, except through the ports formed in the slidable plungers.

It will be apparent from the foregoing description that the four inlet ports leading from the inlet chamber 43 of the valve to the four corresponding outlet chambers will be normally closed by virtue of the fact that the four valves are biased to the right by their respective springs, and, since, as explained in the above referred to patent application of Roy S. Sanford et al., the cam 34 is so formed that the valve plungers may be selectively and individually actuated on corresponding movement of the gear shift lever 33, it will be understood that, on connection of the reservoir 7 to the valve inlet chamber 43 as by means of conduits 78 and 80, the cam 34 may be so actuated by the vehicle operator as to close the exhaust outlet of any selected outlet chamber and to subsequently supply fluid pressure from the reservoir to said chamber through conduits 79 and 80 and inlet chamber 43, while the return of the cam to its normal neutral position will serve to prevent further flow of fluid pressure from the reservoir to the selected outlet chamber and will connect the outlet chamber to atmosphere by means of the passages in the selected plunger, the exhaust chamber 72 and the exhaust port 73. This arrangement provides for selective control and energization of the fluid pressure actuators 12 and 24 of the air gear shift mechanism, it being apparent that actuation of the plunger 36 is adapted to supply fluid pressure to the lower side of piston 25 of the gear shift by way of outlet port 48, conduit 81, and a passage 82 formed in the casing of the gear shift mechanism 5 and communicating with the lower end of the piston. In like manner, operation of the plunger 37 will connect outlet chamber 45 with a chamber 83 formed in the gear shift mechanism by means of conduit 84, outlet chamber 46 may be connected to a similar chamber 85 in the gear shift housing by means of a conduit 86 and the fourth outlet chamber 47 may be connected to the upper side of piston 24 by means of passage 87 formed in the casing of the gear shift and conduit 88 connected therebetween. There are thus four conduits for establishing communication between the reservoir 7 and various chambers of the air gear shift mechanism as through the conduits 81, 84, 86 and 88, and, as will be more fully explained hereinafter, it will be noted that these conduits control respectively the establishment and disestablishment of reverse gear ratio, second speed, third speed and first speed.

In order to insure proper engagement of the shifting element 17 with the proper gear shift rail in response to selection of a particular gear ratio by operation of a control valve 6, the gear shift mechanism is provided with a pair of interlock valves 89 and 90 of similar construction to those provided in the control box 6 and having valve operating plungers 91 and 92 normally occupying the position shown when the gear shift mechanism is deenergized, and both operable by means of cam 93 or 94 on movement of the piston rod 27 in either direction from neutral position to respectively disestablish communication between chambers 83 and 85 and outlet chambers 95 and 96 formed in the valve housings, and at the same time to establish communication through operation of the valve members 97 and 98 between said outlet chambers and passages 87 and 82 respectively. It will be apparent from the foregoing that the supplying of fluid under pressure from the control valve 6 to the outlet chamber 95 either through conduit 88 and passage 87, or through conduit 86 and chamber 85, is controlled by the interlock valve 89. On the other hand, the supply of fluid pressure to the outlet chamber 96 from the control valve 6 through either conduit 81 and passage 82, or conduit 84 and chamber 83, is controlled by the interlock valve 90. These alternative means of supplying air to the outlet chambers 95 and 96 are controlled entirely by the position of the valve plungers 85 and 92, which positions are in turn governed by the operation of the selector piston rod 27 in response to the action of fluid pressure on the selector piston 25. In order to complete energization of the fluid pressure actuator 12 to establish a desired gear ratio after selection thereof by operation of the control valve 6 and energization of the fluid actuator 24, the right side of the actuator piston 18 is supplied with fluid pressure from outlet chamber 95 by means of a conduit 99, while fluid pressure is supplied to the left side of the piston to move piston rod 13 to the right from neutral position by means of a conduit 100.

With the selector piston and interlock valve occupying the position shown in the drawings, it will be seen that actuation of the valve plunger 27 of the control valve 6 will supply air from the reservoir to the left side of the gear shift actuating piston 16 through conduit 84, chamber 83, outlet chamber 96 and conduit 100, moving the piston together with the shifting element 17 and the shift rail 20 to the right to establish second gear relation, while actuation of the valve plunger 38 will serve to supply fluid pressure to the right end of the actuator piston 16 through conduit 86, chamber 85, outlet chamber 95 and conduit 99, thus moving the piston and its associated parts to the left to establish third gear relation. On actuation of the control valve plunger 39 to energize conduit 88, fluid pressure will be supplied to the upper end of the selector piston 24 as well as to passage 87, but no fluid pressure will be supplied to the shifting actuator 12 to establish first gear relation until the piston 25 has moved downwardly sufficiently to cause the cam 93 to actuate the interlock valve plungers 91 and 92, whereupon the valve 97 will be opened to permit communication between passage 87 and outlet chamber 95 and fluid pressure will be conducted to the right side of the actuator piston 16 through conduit 99 to establish first speed gear ratio, it being pointed out that the construction is such that the finger 18 of the shifting element 17 is moved a sufficient distance to engage the slot 31 of the first speed shift rail prior to the actuation of the valve plungers 91 and 92. The selection of reverse gear ratio is similar, except that, in this case, actuation of the control valve plunger 36 will serve to supply fluid pressure through conduit 81 to passage 82 for actuation of the piston 24 in an upward direction to engage the finger 18 with the reverse shift rail 21, after which action the cam 94 will serve to actuate the valve plungers 91 and 92 and permit fluid under pressure to pass from passage 82 to the left side of the gear shift actuator 16 through outlet chamber 96 and conduit 100, thus moving the gear shifting mechanism to the right and establishing reverse gear relation.

Figure 2:
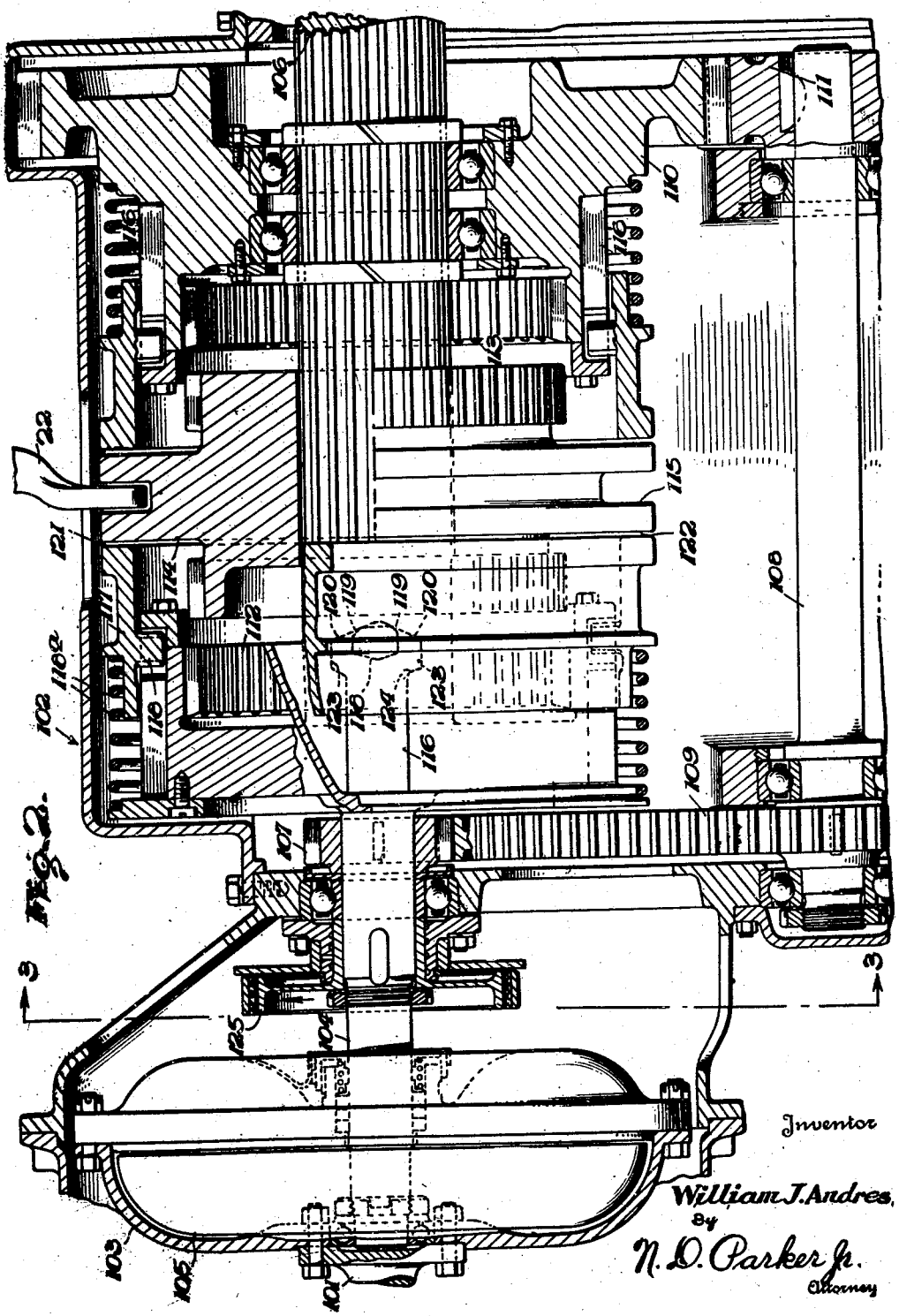
Fig. 2 is a side view of a fluid flywheel, a clutch brake and transmission mechanism adapted for use with the present invention, certain of the parts being shown in section.

While the gear shifting mechanism and the other control mechanisms illustrated in Fig. 1 of the drawings are readily adaptable to any conventional type of transmission and clutch, they are illustrated and described in the present application as being associated with a transmission and clutch mechanism of the type shown in Fig. 2, and it is accordingly believed that a better understanding of the operation of the additional control mechanism of Fig. 1 will be had when considered in the light of the particular transmission and clutch mechanism illustrated in Fig. 2.

With particular reference, therefore, to the latter figure, it will be noted that a crankshaft 101, drivably connected with an engine, not shown, is provided for driving the transmission mechanism 102 and has one member 103 of a conventional fluid flywheel coupling rigidly attached thereto for rotation therewith, while the transmission is provided with a suitably mounted input shaft 104 rigidly connected for rotation with a second member of the fluid flywheel 105. The transmission illustrated is of the so-called constant mesh gear type having jaw clutches slidable for engaging the various gears and establishing the different gear ratios, and, for convenience in describing the transmission shown, sufficient parts are shown to provide for direct drive as well as for a second speed drive, it being understood that the other speeds can be engaged in a similar manner by the addition of the necessary mechanism. The transmission illustrated is provided with an output shaft 106 adapted to be connected to the vehicle propeller shaft for driving the vehicle, and, with the parts in the positions shown, is disconnected from the input shaft. A pinion gear 107 carried by the input shaft is adapted to transmit power through a countershaft 108 mounted in the transmission through its engagement with a gear 109 mounted on the countershaft, and the power from the countershaft is transmitted in turn to a gear 110 rotatably mounted on the output shaft 106 and driven by its engagement with the gear 111 mounted for rotation with the countershaft. Jaw clutches of the internal tooth type 112 and 113 are rigidly carried by the input shaft 104 and by the gear 110 respectively, while a mating clutch member 114 slidably mounted on the splined output shaft 106 for longitudinal movement thereon and rotation therewith serves on movement to the left to engage the jaw clutch 112 and establish a direct drive relation between the input and output shafts and on movement to the right to engage the clutch 113 and establish a drive relation between the input and output shafts through gears 107 and 109, shaft 108 and gears 111 and 110. Movement of the clutch member 114 by the gear shift mechanism is accomplished through the engagement of the shift fork 22 with a groove 115 formed on the clutch member, the fork 22 in turn being carried and operated by the shift rail 20 of Fig. 1.

Due to the different relative speeds encountered between the input shaft 104 and the output shaft 106 under normal conditions of operation, it is obvious that, unless additional mechanism is added to the transmission, serious clashing of the clutch teeth may occur during establishment of gear ratios, and, in order to prevent this undesirable action, means are provided for preventing engagement of either of the clutches from neutral position until a reversal in the direction of relative movement of the input and output shafts occurs, and such mechanism is illustrated in Fig. 2 as including a plurality of slots 116 formed in the outer surfaces of the clutch members 112 and 113, said slots being enlarged as shown at their right and left ends respectively. In addition to these slots, a ring-like member 117 is mounted around the outer circumference of the clutch member 112 and is provided with polygonal shaped inwardly extending spokes 118, which, under the action of a helical spring 118a interposed between the ring 117 and a portion of the clutch member 112, for example, act to normally maintain the angular surfaces 119 of the spokes in engagement with the angular surfaces 120 formed at the right end of the slots, and the ring 117 will thus normally rotate with the clutch member 112 by virtue of the above engagement of the parts. In order to provide means for changing this relationship during engagement of the clutch members 114 and 112, for example, the right end of the ring 117 is formed with a flat surface 121 on the end thereof adapted to engage a similar flat surface 122 formed on the left side of the clutch member 114, the result being that, when the vehicle is standing still, that is, with the input shaft 104 rotating by virtue of its connection with the crankshaft of the engine through the fluid flywheel, and the output shaft 106 stationary, engagement of the surface 122 with the surface 121 on movement of the clutch member 114 to the left to effect direct drive will create friction between the ring and the clutch member in such a manner that further movement of the clutch member 114 to the left will cause the slot to move in one direction or the other, with relation to the spokes 118 and depending upon the direction of rotation of the shaft 104, until the spoke members 118 engage one of the recesses 123 formed in the right end of the slots, further combined movement of the member 114 and 117 to the left causing the left hand faces of the spokes to engage one or the other of the surfaces 124 formed at the left end of the recesses 123. In view of the fact that the dimensions of the spokes 118 and the recesses 123 are so proportioned as to cause engagement of the left surface of the spokes 118 with the right hand recess surfaces 124 prior to actual engagement of the teeth of the jaw clutch members, engagement of the clutch teeth is prevented until the input shaft 104 is so rotated in relation to the output shaft 106 as to bring the spokes 118 in line with the main portion of the slots 116, whereupon the clutch teeth may be engaged and the gear shift completed. When the above transmission is used in connection with a fluid flywheel, it will be evident that, with the vehicle stationary and the vehicle engine running at idling speed, the drag exerted by the fluid flywheel, if of conventional design, will be sufficient to continuously rotate the shaft 104 in the same direction of rotation as the engine, and consequently means must be provided to not only stop the rotation of shaft 104, but to turn it in the reverse direction before the locking mechanism above described can be operated to place the spokes 118 in alignment with the slots 116 and permit further movement of ring 117 and member 114 for engagement of the clutch members 112 and 114.

Figure 3:
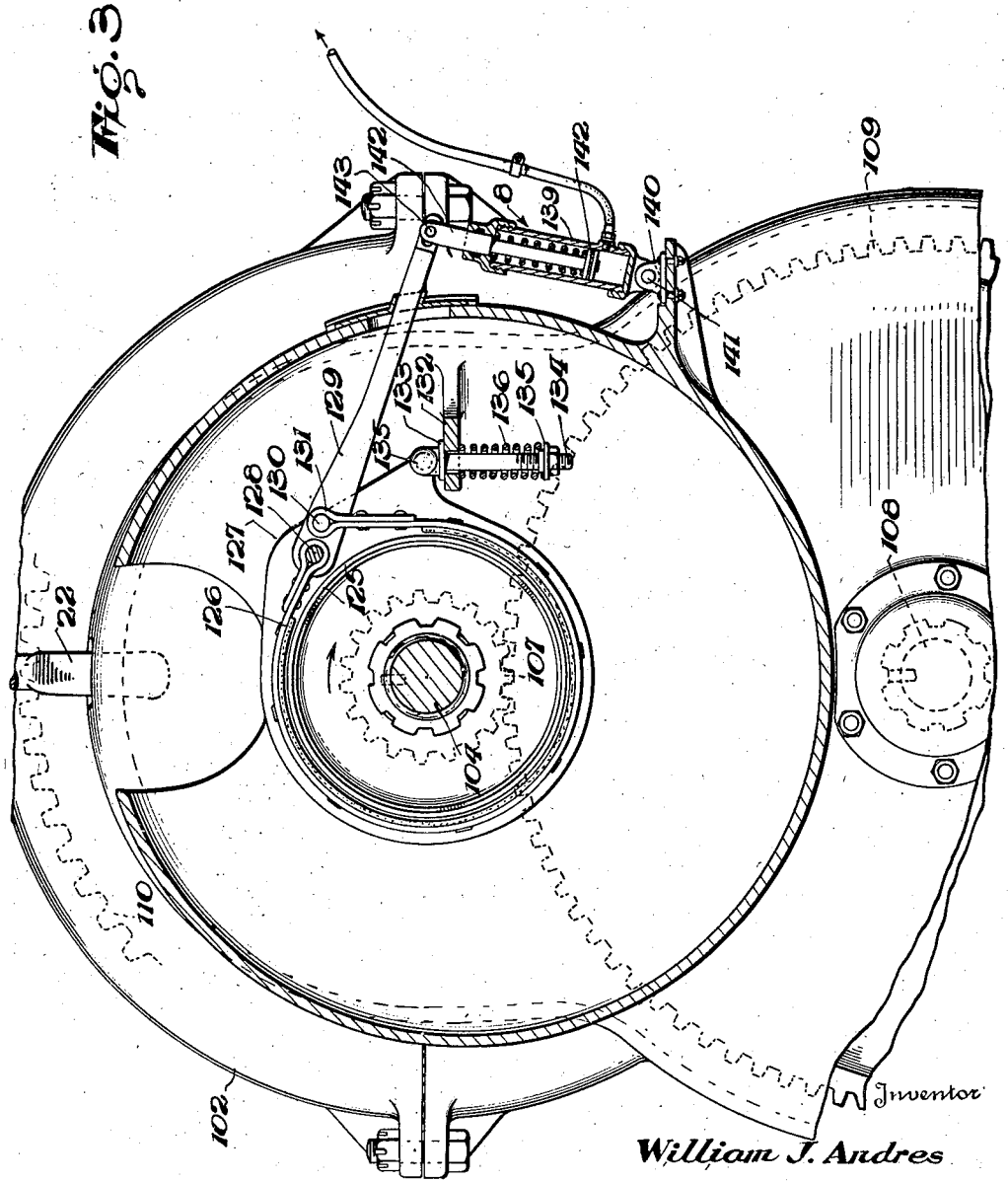
Fig. 3 is a partial view in section taken along lines 3—3 of Fig. 2.

Although the use of clutch brakes is well known for retarding or stopping the motion of the driven member of a vehicle clutch, a novel clutch brake is illustrated in the drawings of the present application and more particularly in Fig. 3, as comprising means for not only stopping the rotation of the driven member of the clutch, but for also reversing the direction of rotation thereof. To this end, a brake drum 125 is mounted on the input shaft 104 for rotation therewith, while a brake band 126, see Fig. 3, is pivotally mounted on a plate 127 rotatably mounted on the housing of the transmission for concentric rotation with the brake drum, the pivotal connection being established by means of a pivot pin 128 carried by the plate 127. A brake operating lever 129 is also mounted on the pivot pin 128, and is pivotally connected to the other end of the brake band by means of a pin 130 carried by the lever and mounted in a bore 131 formed in the end of the brake band. As viewed in Fig. 3, the input shaft and the attached brake drum 125 are considered as rotating in a clockwise direction, counterclockwise, and, on movement of the brake lever 29 about the pivot pin 128, it is evident that the brake band will be contracted about the brake drum and tend to stop the rotation of the latter, the reaction created by this operation being transferred to a portion of the transmission casing 132 through the medium of a flange 133 formed on a bolt 134 pivotally attached to the plate 127 by means of a pivot pin 135. As soon as the rotation of the brake drum in a clockwise direction is stopped, however, it will be apparent that further movement of the brake lever in a counterclockwise direction will tend to rotate the drum in a reverse direction, and a movable brake anchor including spring 136 interposed between the lower side of the casing portion 132 and the upper side of an adjustable nut threadedly carried by the bolt 134 permits this desirable action to occur, the depression of the spring 136 allowing the plate 127, brake band 126 and the brake drum 125 to rotate through a comparatively small arc in a counterclockwise direction. In the illustrated embodiment of the invention, the fluid motor 8 is provided for actuating the brake lever 129 in a counterclockwise direction, this motor comprising a cylinder 139 pivotally connected to a stationary portion of the transmission 140 as by means of a pivot pin 141 and having a piston 142 slidably mounted therein and connected to the end of lever 129 remote from the brake band by means of piston rod 142 and pivot pin 143.

In view of the foregoing description of the transmission and brake mechanism, it will be understood that a reversal in the direction of movement of the input shaft 104 is necessary in order to permit engagement of a gear ratio when the vehicle is stationary, that is, when the output shaft 106 is not turning, and this necessary action is accomplished by the operation of the clutch brake as described. In addition, however, it will be evident to those skilled in the art that, when the vehicle is moving and the clutch member 114 is brought to neutral position preparatory to engaging a new gear relation, an attempted shift from a lower to a higher speed gear requires a longer waiting period in neutral position to permit approximate synchronization of the speeds of the two members to be engaged, such as clutch members 112 and 114, than is required when shifting from a higher gear to a lower speed gear ratio, it being noted that when the vehicle is moving with a low speed gear ratio engaged the shaft 104 rotates at a higher rate of speed than the shaft 106, with the result that a relatively large amount of energy is stored in the rotating parts associated with the shaft 104, it thus requiring a longer period of time for the shaft 104 to slow down to the speed of the shaft 106 unless means such as the clutch brake shown in the drawings is employed for the purpose of more rapidly retarding the speed of rotation of the shaft 104. In like manner, it will be apparent that when direct drive is established, for example, the shafts 104 and 106 will be rotating at the same speed when the vehicle is moving along the highway, and on operation of the gear ratio changing mechanism to establish a lower speed ratio, the speed of rotation of the shaft 104 will have to be increased in order to bring the engaging parts for establishing the lower speed gear ratio to the same rotating speed. With particular reference to the transmission mechanism illustrated in Fig. 2, it will be noted that, when shifting from second speed to high speed or direct drive, the engine and consequently the input shaft 104 will initially be turning at a much higher rate of speed than the output shaft 106, with the result that, when the clutch member 114 is brought to neutral position, any further movement of the member to the left will cause the member 114 to pick up the ring 117 and turn the ring sufficiently to cause the spokes 118 to engage one of the recesses 123 formed at the end of the slot 116 and prevent further movement of the clutch member to complete establishment of the high speed gear ratio. If this were not the case, serious gear clashing would occur with probable damage to the teeth of the clutches during the time required for the input shaft 104 to slow down sufficiently to match the speed of the output shaft 106 on reduction of the engine speed by the action of the operator in operating the throttle control or any other control for reducing the speed of the engine. Consequently, actual engagement of the clutches to establish high gear ratio will here be prevented as in the case previously described with the vehicle stationary, due to the fact that the relative speeds of the input and output shafts of the transmission are different, and it will be obvious that a reversal in direction of these relative speeds must be brought about before the spokes 118 can move out of the recesses 123 and into alignment with slots 116 to permit engagement of the high gear ratio. This action will, of course, occur in time on deceleration of the engine, but on the larger vehicles a considerable amount of vehicle speed is lost during this period, and accordingly the clutch brake heretofore described is intended not only to effect stoppage of and to reverse rotation of the clutch brake drum during engagement of the gears when the vehicle is stationary, but it is also intended to act as an ordinary clutch brake to slow down the speed of the brake drum and the input shaft during a shift of gears upwardly in order to materially lessen the time required for such gear shifting. A clutch brake of the type described is accordingly particularly beneficial for use in connection with gear shifting mechanism having a device of the type described for preventing engagement of the gears until the speeds of the respective shafts attached to those gears cross, and is also particularly effective in connection with a clutch of the fluid flywheel type, wherein a continuous drag in one direction is exerted on the input shaft of the transmission whenever the engine of the vehicle is running, but it is to be understood that the use of such a clutch brake in connection with the controlling means about to be described is also beneficial in facilitating and speeding up gear shifting operations from a lower to a higher ratio if the ring 117 and its associated mechanism in the transmission is dispensed with, and if the fluid flywheel is replaced with the more conventional type of friction clutch. Regardless of the type of clutch used, the flywheel or inertia effect of the parts rotating with the input shaft 104 is considerable, and a clutch brake of the type shown or of any other suitable type, when controlled in the manner about to be described, serves to materially decrease the time necessary for the above gear shifting operation.

Referring again to Fig. 1 of the drawings, it will be noted, as will be more fully described hereinafter, that an automatic valve responsive to variations of pressure in the intake manifold, not shown, of the engine is provided for connecting and disconnecting the fluid pressure supply reservoir with the clutch brake cylinder 8, that a valve 10 operated by movement of the gear shifting mechanism is effective to prevent the supplying of fluid pressure by the valve 9 to the cylinder 8 except when the gear shift is in neutral, and that an operator controlled valve 11 is also provided to allow the operator to control the supply of fluid pressure to the brake cylinder 8 at his discretion, regardless of the action of the other two control valves above mentioned. The valve 10 mounted on the casing of the fluid pressure gear shifting mechanism comprises a casing 144 having an inlet chamber 145 and an outlet chamber 146, these chambers being separated by a partition 147 having a port 148 therethrough normally closed by means of a valve member 149 normally urged against the upper end of the port 148 by means of a spring 150. A plunger 151 is slidably mounted in the casing having a port 152 therethrough connecting the outlet chamber 146 with a chamber 153 in such a way that, with the plunger 151 in the position shown, communication between the inlet and outlet chambers 145 and 146 respectively is interrupted and communication between chambers 146 and 153 is provided through the port 152 in the valve operating plunger. On the other hand, it will be evident that, on an upward movement of the plunger 151, the end of the port 152 formed therein will engage the lower end of the valve member 149, effectively preventing communication between chambers 146 and 153, and at the same time moving the valve member 149 to open position to permit communication between chambers 145 and 146. The piston rod 13 in the gear shift mechanism 5 is provided with a sleeve 154 having a groove 155 formed thereon for normally receiving the lower end of the plunger 151 and having cam surfaces 156 formed on either side of the groove adapted to lift the plunger to operate the valve mechanism of the valve 10 on movement of the piston rod 13 to the right or to the left from neutral position, in such a manner as to establish communication between chambers 145 and 146 and to prevent communication between chambers 146 and 153 except when the gear shift is in neutral position.

The pressure responsive valve 9 serves under certain conditions to supply fluid pressure from the reservoir 7 to the chamber 153 of the valve 10 and comprises a casing 157 divided into inlet and outlet chambers 158 and 159 respectively by means of a partition 160 carried by the housing and having a port 161 formed centrally therein and normally closed by the lower portion of an intake and exhaust valve member 162 which is urged in an upward direction by means of a valve spring 163 interposed between the upper end of the valve and the upper side of the partition 160. The upper portion of the casing 157 is divided into a pair of chambers 164 and 165 by means of a pressure responsive diaphragm 166, the chamber 164 below the diaphragm being connected at all times to the intake manifold of the engine through a conduit 167 and the chamber 165 being connected to atmosphere through ports 168. A hollow plunger 169 is slidably mounted in the outlet chamber 163 and is normally maintained in the position shown by means of a spring 170 interposed between the plunger and the upper side of the partition 160, thus normally providing communication between the outlet chamber 159 and a port 171 formed centrally in the upper portion of the casing through the bore 172 formed in the plunger, it being noted that a pair of sealing devices 173 and 174 provided in the casing of the valve and acting on the outer surface of the plunger serve to prevent the flow of fluid pressure past the plunger to or from chambers 164 and 165 respectively. Enlarged portion 175 of the plunger forms a pressure responsive piston in the bore of the outlet chamber 159 and the chamber 176 formed in the casing above the piston is vented to atmosphere through a vent 177 in order to prevent equalization of pressure on both sides of the piston due to possible leakage by the piston. The central portion of the diaphragm member 166 bears against the shoulder 178 formed on the plunger, and it will be readily apparent that, when the chamber 164 is sufficiently evacuated, the diaphragm will move the plunger downwardly in such a manner as to overcome the spring 170, allowing the upper end of the valve member 162 to close the bore 172 of the plunger and subsequently move the valve 162 downwardly from port 161 and connect chambers 158 and 159 through the port 161. For reasons to be described hereinafter, the spring 170 is so proportioned and adjusted as to prevent movement of the plunger to operate the valves in the manner just described when the vacuum in the chamber 164 corresponds to that in the intake manifold of an engine running at idling speed without load, a higher degree of vacuum such as might be obtained when the engine is rapidly decelerating with the throttle closed being necessary to move the diaphragm downwardly against the spring and operate the valve to connect the chambers 158 and 159, and the output pressure of the valve mechanism for a particular degree of vacuum necessary being determined by the spring 170 and the pressure on piston 175.

In order that the vacuum operated valve 9 may serve to supply fluid under pressure from the reservoir 7 to the clutch brake actuator 8, the inlet chamber 158 of the valve 9 is connected with the reservoir by means of a conduit 179, while the outlet chamber 159 is connected with the chamber 153 of the valve 10 by means of a conduit 180. In view of the fact that a conduit 181 is connected between the outlet chamber 146 of the valve 10 and the cylinder of the fluid motor 8, it will be seen that, when the engine is decelerating from a high speed to a lower speed, a sufficient degree of vacuum may be set up in chamber 164 of the valve 9 to move the diaphragm downwardly, thus connecting conduits 179 and 180 and allowing fluid pressure from the reservoir 7 to flow to the fluid motor 8 through conduit 179, chamber 158, chamber 159, conduit 180, chamber 153 of the valve 10, port 153, outlet chamber 146, and conduit 181, while a reduction in the degree of vacuum in the chamber 164 when the engine reaches or approaches idling condition will allow the plunger of the valve 9 to again move upwardly under the action of the spring 170, thus allowing the fluid to be exhausted from the cylinder 8 in the reverse direction through the outlet chamber 159 of the valve 9 and thence through the bore 172 of the valve plunger to port 171.

The control valve 11 is substantially identical with that of the valve 10 so far as the internal construction is concerned, in that a similar valve mechanism and valve operating plunger is provided in such a manner that the plunger 182 is manually operated in the downward direction by the pedal 183 to connect the conduit 79 with an outlet conduit 184 to supply fluid pressure from the reservoir 7 to the latter conduit, while, on release of the pedal 183, the valve operating plunger 182 moves upwardly and operates the valve mechanism to close the connection between conduits 79 and 184 and to establish communication between conduit 184 and an exhaust port 185 of the valve. This being the case and referring to the foregoing description of the operation of the valve 9 in supplying fluid pressure to the clutch brake cylinder 8, it will be understood that, when the valve mechanism of the valve 9 is moved to exhaust position, the fluid pressure released from the cylinder 8 to the port 171 will be exhausted therefrom through a conduit 186 connected with the conduit 184 to the latter conduits and thence through the valve 11 to atmosphere by way of the exhaust conduit 185.

The valve 11 is provided primarily for the purpose of allowing the gears to be engaged when the vehicle is standing still with the engine idling, under which conditions it will be recalled that the output shaft 106 of the transmission, as shown in Fig. 2, is stationary, while the input shaft 104 is rotating under the influence of the fluid flywheel, making it necessary to stop and reverse the motion of the input shaft before the gears can be engaged in the desired ratio. It is obviously undesirable under such a condition for the vehicle operator to have to race the engine and then allow it to decelerate in order to obtain sufficient degree of vacuum in chamber 164 of the valve 9 to effect energization of the fluid motor 8 to apply the brakes and reverse the movement of the transmission input shaft 104, and in this case the operator has recourse to the use of the valve 11 to connect the reservoir 7 with the brake cylinder 8, through conduit 179, the valve 11, conduit 184, conduit 186, port 171 of the valve 9, bore 172, chamber 159 of valve 9, conduit 180, chamber 153 of the valve 10, port 152 in the valve plunger, outlet chamber 146 and conduit 181, it being obvious that, due to the fact that the inlet port of the valve 10 is closed when the gear shift is in neutral position, no connection exists between the conduit 184 and the conduit 181 directly through the valve 10. If the clutch brake is held in applied position by operation of the valve 11 until the desired gear is engaged, the valve may then be moved to exhaust position by release of pedal 183, and fluid pressure will be exhausted from the fluid motor 8 through conduit 181, outlet chamber 146 of the valve 10, port 148 of the valve 10, outlet chamber 145, conduit 184, and thence through the valve 11 to atmosphere by way of exhaust conduit 185, it being noted in this connection that, as soon as the gear shift mechanism operates to engage the desired gear ratio, the plunger 151 of the valve 10 is moved upwardly to disconnect chambers 153 and 146 and to connect chambers 146 and 145 in such a manner that the fluid pressure in the motor 8 must be exhausted through a different path than that through which it was originally supplied to the motor. It is evident from the foregoing description that, due to the operation of the valve 10 by movement of the piston rod 13 of the gear shift mechanism toward gear-engaged position, the fluid motor 8 can only be supplied with fluid to operate the clutch brake when the gears are moved toward such position by deliberate use of the valve 11 by the operator, the apparatus being so arranged in order to prevent unnecessary sudden deceleration or jerking of the vehicle by application of the clutch brake when the gears are in engaged position, and, in this connection, the vehicle operator is usually instructed to use the valve 11 only when the vehicle is stationary and when it is desired to engage one of the lower speed gears in order to start the vehicle in motion.

It has been pointed out heretofore that, with the type of transmission and clutch illustrated in connection with the present invention, it is impossible to engage the gears when the vehicle is at rest without reversing the direction of movement of the transmission input shaft 104, and it will accordingly be seen that, if it were possible to operate the cam 34 of the gear shift control valve 6 to energize conduit 88 to cause engagement of first speed by the gear shift mechanism, it would not matter whether the gear shift was energized by the operation of valve 6 prior to the operation of the clutch brake by operation of the valve 11 or whether the reverse action took place. In many transmissions of the type illustrated in Fig. 2, however, the mechanism for preventing engagement of the gears prior to operation of the clutch brake to reverse the direction of movement of the shaft 104 is omitted in connection with reverse gear for reasons of economy or otherwise, and in this case it is quite evident that operation of the valve 6 to energize conduit 81 and shift the gears to reverse position would result in severe clashing of the gears due to the drag exerted by the fluid flywheel on the input shaft of the transmission 104 in the absence of clutch brake operation prior to the gear shifting operation, and there is accordingly provided by the present invention an interlocking device in the control valve 6 actuated by fluid pressure from the manually operable valve 11 to prevent operation of the valve cam shaft 34 to actuate the valve plunger 36 to energize conduit 81 for selecting and establishing reverse gear until the conduits for energizing the fluid motor of the clutch brake have been supplied with fluid pressure through operation of the valve 11. With particular reference to Fig. 1, and to the structure of the control valve 6, it will be noted that the casing of the valve is provided with a pair of bores 187 and 188 of different diameters with a fluid pressure receiving chamber 189 formed between said bores for receiving fluid pressure from a continuation of the conduit 186 connected therewith. A latch element 190 is also slidably mounted in the casing of the valve 6 and is provided with piston-like portions 191 and 192 respectively, the respective diameters of these pistons being such that, on admission of fluid pressure to the chamber 189, the latch is moved to the left against the tension of a spring 193 interposed between the left end of the piston 191 and the left end of the bore 187, which bore is isolated from the inlet chamber 43 of the valve by means of the cover gasket 41. An atmospheric vent 194 is also provided at the left end of the bore 187 to permit the escape of any fluid leaking by the piston 191. The right end of the latch member 190 normally engages a slot 195 formed in the lower end of the cam shaft 34 and prevents upward movement of the cam shaft to a position suitable for selecting and actuating the plunger 36 to energize the reverse speed line to the gear shifting mechanism. It will thus be apparent that, in order to engage reverse gear without clashing, it is necessary for the operator to apply the clutch brake through the operation of the valve 11 before the cam shaft 34 of the valve 6 can be operated to energize the fluid pressure operated gear shift mechanism to effect selection and establishment of reverse gear ratio.

While the transmission, clutch brake, fluid pressure gear shift mechanism and the controlling mechanism therefor have been described with considerable particularity, it will be noted that two control mechanisms have been provided for independently energizing the fluid motor 8 to operate the clutch brake, while a valve 10 automatically operated by the operation of the gear shifting mechanism controls the application of fluid pressure to the fluid motor 8 from the vacuum operated valve 9, but does not serve to prevent control of the fluid motor by the valve 11 since fluid under pressure is free to pass from this valve through conduit 184 to the clutch brake cylinder through two separate paths depending on the position of the valve parts in the valve 10 and in the valve 9.

In starting a vehicle equipped with mechanism of the above type from rest in a forward direction, the operator has only to operate the cam shaft 34 of the valve 6 to move the plunger 39 to the left, supplying fluid pressure from the reservoir 7 to the passage 87 of the gear shift mechanism through conduits 79 and 80, inlet chamber 43, outlet chamber 47, port 51 and conduit 88, whereupon the pressure acting on the upper side of the piston 25 will move the piston rod 27 downwardly to rock the shifting element 17 about its mounting on the main shift or piston rod 13 to cause the finger 18 to engage in slot 31 in the gear shift rail 19. After the finger has engaged the slot 31, further movement of the piston rod 27 will cause the cam face 93 to actuate the plungers 91 and 92 of the interlock valves 89 and 90 so that fluid under pressure from passage 87, which has already been energized, will pass by the valve 97 into the outlet chamber 95 and thence to the right side of the main gear shift piston 16 through conduit 99. Since the first gear mechanism is ordinarily equipped with a lockout device similar to that shown in Fig. 2, it will be impossible for the piston 16 to move to the left to effect engagement of the low speed gear ratio until the valve 11 has been actuated to supply fluid pressure to the clutch brake motor 8 from the reservoir 7 through conduit 79, the valve 11, conduits 184 and 186, port 171 of the vacuum operated valve 9, bore 172 of the valve plunger, outlet chamber 159, conduit 180, chamber 153 of valve 10, port 152 in the plunger 151, the outlet chamber 146 of the valve 10 and conduit 181, whereupon the clutch brake will be applied to reverse the direction of rotation of shaft 104, shown in Fig. 2, thus operating the lockout mechanism to permit engagement of first gear. The vehicle is then accelerated in low gear by acceleration of the engine by the operator, and, when a shift from first to second speed position is desired, the operator first operates the cam 34 of the valve 6 to release the plunger 39 and actuate the plunger 37 for energizing the chamber 83 of the interlock valve 90 through conduit 84, further energization of the gear shift mechanism being prevented until the spring 15 in the gear shift mechanism has moved the shift element 17 and shift rail 19 to the right to a position where the slots in the gear shift rails are again in alignment, whereupon the spring 26 above the selector piston returns the piston to neutral position allowing the plunger 92 of the interlock valve 90 to move to the left again and establish communication between chamber 83 and outlet chamber 96 of the valve, thus establishing communication between conduit 84 and the right side of the main-shift shifter piston 16. The fluid pressure on the left side of the piston will not, however, move the shift rail 20 into second speed position because of the action of the lockout device incorporated in the transmission, but, since, under these conditions, it is customary for the operator to rapidly reduce the speed of the engine to idling speed by releasing his foot from the accelerator, the vacuum in the intake manifold will rise to a value higher than that normally present when the engine is idling, and this increase in vacuum conveyed to chamber 164 of the valve 9 through conduit 167 is sufficient to cause the diaphragm 166 to actuate the valve member 162 to establish communication between conduits 179 and 180 and thence to the clutch brake cylinder 8 through chamber 153, passage 152, and outlet chamber 146 of the valve 10, which, on return of the gear shift piston rod 13 to neutral, is in the position shown in Fig. 1, and from there to the cylinder 8 through the conduit 21. Under this condition of operation, it will be clear that both the input shaft and the output shaft of the transmission are rotating at different speeds, the input shaft being rotated at a higher speed than the output shaft at the time the gear shift from low to second is attempted by the operator. While traveling on a level road, the output shaft will continue to rotate at substantially the same speed for a small period of time, but the input shaft will be slowed down due to deceleration of the vehicle engine and the action of the clutch brake will act to slow it down at a rapid rate so that a point will be reached where the speed of the input shaft is less than that of the output shaft, at which time the lockout mechanism of the transmission will be operated by the friction between surfaces 121 and 122 of the clutch members shown in Fig. 2, and the fluid pressure at the left side of the piston 16 will move the piston to the right against the opposing spring 14 to complete the establishment of second speed. As soon as the shift is completed, which happens almost instantaneously, the operator increases the engine speed, whereupon the fluid clutch again transmits power to the input shaft of the transmission and takes up the drive of the vehicle in the second speed relation. The operation of the control mechanism to change from second to third speed or direct drive is substantially the same and it is believed that a detailed explanation of this operation is unnecessary in view of the previous description. The shift downwardly from a higher speed to a lower speed is substantially the same regardless of whether the shift is from high to second or from second to low, and the shift from second to low which is the reverse of that which has just been described will be explained. With a vehicle running in second speed, the speed of the input shaft relative to that of the output shaft of the transmission will be relatively less for a given vehicle speed than it would be with the transmission shifted to the low speed gear relation and consequently, when a shift from second to low is contemplated, it will be necessary to speed up the input shaft with relation to the speed of the output shaft before a reversal in the relative direction of rotation of the two shafts can be obtained to operate the lockout device in the transmission, and it is obvious that an application of the clutch brake during this operation would hinder the speeding up of the input shaft rather than help it, and it is accordingly customary in handling transmissions and control systems of this type for the operator to maintain the engine at a high speed by maintaining the accelerator in depressed position while operating the valve 6 to again supply fluid pressure to the right side of the gear shift piston 16 to return the gear shift to neutral and thereafter engage first speed, and whereas the operation of the clutch brake was of a semi-automatic nature during the shift from a low to a higher speed and dependent on the vacuum in the intake manifold, it will be apparent that, during a shift from second to low speed, with the speed of the engine maintained at a high point, the vacuum in the intake manifold of the engine and hence in the chamber 164 of the valve 9 will be insufficient to actuate the valve to supply fluid pressure from conduit 179 to conduit 180 and thence to the clutch brake cylinder 8, and accordingly, under this condition of operation, there will be no retarding of the rotation of the input shaft of the transmission by the action of the clutch brake during the momentary pause of the gear shift mechanism in neutral position and the gear shift to the lower gear will take place with a minimum loss of time.

There has thus been provided by the present invention an efficient and very simple automatic control mechanism for controlling the clutch brake of a clutch and transmission system in response to variations of operating conditions in order to facilitate shifting of the gears from any selected position to another position, and it will be apparent to those skilled in the art that the invention is not limited to the illustrated form but may readily take other forms well adapted to establish the necessary controlling action outlined heretofore. It will also be noted that the particular fluid pressure operated gear shift mechanism illustrated in connection with the present invention is preselective in its operation, as is the case in the disclosure of the Sanford et al. application referred to at the beginning of the description, and this preselective operation will simplify the duties of the vehicle operator, in view of the fact that it is unnecessary for him to retain the gear shift lever 33 and the attached cam 34 of the valve 6 in neutral position pending the operation of the lockout device under the influence of the clutch brake before proceeding to the next gear position. Hence, the valve 6 may be operated to select and cause establishment of any of the four gear ratio positions shown with the assurance that the shift will subsequently be made dependent only on the condition of operation of the vehicle engine which governs the degree of pressure in the intake manifold thereof, and, in controlling the operation of the vehicle engine, it is only necessary for the vehicle operator to distinguish between a shift from a lower gear to a higher gear and a shift from a higher gear to a lower gear.

While one embodiment of the present invention has been illustrated and described herein with considerable particularity, it will be understood that the same is not limited thereto but is capable of expression in a variety of forms as will be well understood by those skilled in the art. For example, while the present apparatus has been described in connection with operation by fluid from a source of fluid pressure, it is contemplated that any source of power such as vacuum, compressed air, oil or electrical power may be utilized. Various other changes and modifications will occur to those skilled in the art without departing from the spirit of the invention. Reference will, therefore, be had to the appended claims for a definition of the limits thereof.

What is claimed is:

1. In a motor vehicle having an engine and an intake manifold, a transmission of the type having a driving shaft and a driven shaft, shiftable means for establishing desired gear ratios between said shafts, an element for shifting said means and means responsive to a speed differential in one direction between said shafts for preventing the establishment of a desired gear ratio and responsive to a change in the direction of said speed differential for permitting establishment of said desired gear ratios, power means for shifting said element to establish a desired gear ratio and control means for said power means for conditioning said power means to select and establish a desired gear ratio prior to the actual establishment thereof, a brake on said driving shaft for changing the speed of said shaft and changing the direction of speed differential between said driving and driven shafts, power means for actuating said brake, and valvular means controlled by movement of the shiftable element and by the vacuum in the intake manifold of the engine for controlling the action of said brake.

2. In a gear shift control mechanism for a motor vehicle having an engine provided with an intake manifold, a transmission of the type having an input shaft, an output shaft, shiftable means for establishing different gear ratios between said shafts, a shiftable element for moving said means, and means actuated by relative movement of said shafts in one direction for preventing engagement of the gearing and actuated by a reversal in the direction of said relative movement for permitting engagement of the gearing, a clutch for driving said input shaft having an element connected with the engine and an element connected with the input shaft, a floating clutch brake associated with the input shaft for stopping and reversing the direction of motion thereof, power means for actuating said shiftable element to establish a desired gear ratio, control means for said power shifting means for energizing the power means to establish a desired gear ratio, power means for actuating said clutch brake, means associated with the shiftable element of the transmission and controlled thereby for controlling the supply of power to said last named power means when the gears are disengaged, and means actuated by the vacuum in the intake manifold of the engine for controlling the supply of power to the means associated with said shiftable element, whereby the direction of movement of the input shaft in relation to the output shaft is reversed for permitting the power means to establish the selected gear ratio.

3. The combination in a vehicle having an engine provided with an intake manifold, a transmission of the type having input and output shafts, means shiftable for establishing different gear ratios between said shafts and means responsive to changes in the relative direction of rotation of said shafts for preventing or permitting shifting movement of said means, a clutch for transmitting power from said engine to said transmission including a member driven by the engine and a member connected to the input shaft and driven by said engine driven member, and a power operated brake associated with the input shaft and operable to change the relative speeds of said input and output shafts, of an element for shifting said shiftable means to establish a desired gear ratio, means actuated by said element for controlling the energization of said power operated brake, and means controlled by the pressure in the intake manifold of the engine for controlling the supply of power to said brake energization controlling means.

4. The combination in a motor vehicle having an engine provided with an intake manifold, a transmission having shiftable means, means for shifting said means, a clutch for transmitting power from the engine to the transmission including an element driven by the engine and an element connected with the transmission, and a clutch brake associated with the second clutch element for changing the speed thereof and facilitating shifting of the gears, of serially connected control means including a valve actuated by the shifting means and a valve actuated by the pressure in the intake manifold of the engine respectively for controlling the operation of said clutch brake.

5. The combination in a motor vehicle having an engine provided with an intake manifold, a transmission of the type having input and output shafts, and means shiftable from neutral to driving positions to establish desired gear ratios between said shafts, an element for shifting said means, a clutch for controlling the transmission of power from the engine to the input shaft including an element driven by the engine and an element for driving the input shaft, and a clutch brake associated with the input shaft for varying the speed thereof to facilitate the establishment of the shiftable means in different speed ratios, of means including a control valve responsive to a predetermined pressure in the intake manifold for controlling the action of said clutch brake when said shiftable element is in neutral position.

6. The combination in a motor vehicle having an engine provided with an intake manifold, a transmission of the type having input and output shafts, and shiftable means for establishing different gear ratios between said shafts, an element associated with the transmission having neutral and gear-engaged positions for shifting said means to establish said desired gear ratios, means for transmitting power from the engine to the input shaft of the transmission including a member driven by the engine and a member driven thereby for driving the input shaft, and a clutch brake associated with the input shaft and operable for changing the speed of said input shaft for facilitating operation of said shiftable means, of means including a valve responsive to intake manifold pressure of engine for controlling the operation of said clutch brake, and means controlled by movement of said shiftable element to gear engaged position for rendering said last named means ineffective for controlling said brake.

7. The combination in a motor vehicle having an engine provided with an intake manifold, a transmission of the type having input and output shafts and means shiftable from neutral position to establish desired gear ratios between said shafts, and means responsive to variations in the relative direction of rotation of said shafts to permit or prevent movement of said means from neutral to gear-engaged position, a shiftable element for moving said means, means for transmitting power from the engine to the input shaft including an element driven by the engine and an element driven by said engine driven element and connected to the input shaft, and a floating brake associated with the input shaft for changing the speed and direction of rotation thereof, of means including a valve controlled by the pressure in the intake manifold for controlling the operation of said brake when the shiftable element is in neutral position, and operator-controlled means for controlling the operation of said brake regardless of the position of said shiftable means.

8. The combination in a motor vehicle having an engine provided with an intake manifold, a transmission of the type having input and output shafts, shiftable gear ratio changing means normally occupying a neutral position and shiftable to establish different gear ratios between said shafts, means associated with said shiftable means and responsive to changes in the relative direction of rotation of said input and output shafts for preventing or permitting engaging movement of said shiftable means, a brake associated with the input shaft for varying the speed thereof, a fluid motor for actuating said brake and a shiftable element for moving said shiftable means, and a source of fluid pressure, of valvular means controlled by the pressure in the intake manifold for supplying fluid pressure from said source to said motor for actuating said brake, and means controlled by movement of said shiftable element to gear-engaged position for preventing the supplying of fluid pressure to said motor by the operation of said last named means.

9. The combination in a motor vehicle having an engine provided with an intake manifold, a transmission of the type having input and output shafts, means shiftable from neutral position to establish different gear ratios between said shafts and means controlled by the rotational relationship between said shafts for permitting or preventing movement of said shiftable means to establish said ratios, an element for shifting said means, a brake associated with said input shaft for controlling the rotation thereof, a source of fluid pressure and a fluid motor for actuating said brake, of valvular means including a member responsive to the pressure in the intake manifold for connecting and disconnecting said source and motor, and means responsive to movement of said shiftable element for preventing establishment of a connection between said source and motor when the shiftable means are in gear ratio establishing position.

10. The combination with a motor vehicle having an engine provided with an intake manifold, a transmission of the type having input and output shafts, shiftable means movable from neutral position for the establishment of different gear ratios between said shafts, and means responsive to the relative movement of said shafts when the transmission is in neutral and the output shaft is stationary for preventing engaging movement of said shiftable means, a shiftable element for moving said means to engaged position from neutral, a fluid actuator for actuating said element to move said shiftable means, valvular means for selectively controlling the flow of fluid pressure to said actuator to select and control the establishment of the different gear ratios, means including a pressure responsive member associated with said valvular means for normally preventing the selection of one of said gear ratios, a clutch for connecting the engine with the input shaft including a member driven by the engine and a member connected with the input shaft for normally driving the input shaft in one direction only, a floating brake for stopping and reversing the direction of rotation of the input shaft and a fluid motor for actuating said brake, of means controlled by the degree of vacuum in the intake manifold for controlling the flow of fluid pressure to and from said actuator for applying and releasing the brake when the shiftable element is in neutral position, means controlled by movement of said shiftable element to gear-engaged position for preventing control of the fluid motor by said last named means, and operator-controlled means for supplying fluid pressure to said motor to apply the brake to stop and reverse the rotation of said input shaft and to actuate the pressure responsive member of the control valve to permit operation of said control valve to effect energization of the actuator to effect establishment of said one gear ratio.

11. The combination in a motor vehicle having an engine provided with an intake manifold, a transmission having shiftable means to establish different gear ratios, a clutch for transmitting power from the engine to the transmission, including a member driven by the engine and a member driven by said engine driven member connected with the transmission, a brake associated with said second named clutch member operable for retarding the speed thereof for facilitating engagement of the shiftable means, a motor for actuating said brake and a shiftable element for moving the shiftable means to and from gear-engaged position, of means operable in response to a predetermined pressure in the intake manifold for energizing said motor to apply the brake and operable at a different predetermined intake manifold pressure to deenergize the motor when the gear shifting element is in neutral position, and means actuated during movement of the gear shifting element to gear-engaged position for preventing energization of said motor by said means.

12. The combination in a motor vehicle having an engine, a transmission having input and output shafts and means shiftable from neutral position to gear-engaged position for operatively connecting said shafts, means responsive to relative movement between said shafts in one direction for preventing movement of said gears to gear-engaged position and responsive to a reversal in said relative direction of movement of said shafts for permitting movement of said shiftable means to gear-engaged position, a shiftable element for moving said means from neutral to gear-engaged position, a fluid clutch connecting said engine with said transmission input shaft and tending to rotate said shaft in the same direction as the engine regardless of engine speed, a floating brake associated with said input shaft for retarding and reversing the direction of rotation of said shaft, a fluid motor for operating said brake, a fluid pressure actuator for moving said shiftable element to and from gear-engaged position, and a control valve operable for supplying fluid pressure to said actuator for moving said element, of operator-controlled means for supplying fluid pressure to said motor independently of the operation of said control valve to actuate the brake and reverse the direction of rotation of the input shaft, and means associated with the control valve mechanism for the fluid pressure actuator and actuated by the fluid pressure supplied to the fluid motor by the manually operable means for preventing energization of said fluid pressure actuator by the valvular mechanism until fluid pressure has been supplied to said fluid motor for actuating the brake.

13. The combination in a motor vehicle having an engine provided with an intake manifold, a transmission of the type having input and output shafts, shiftable means movable to establish or disestablish a plurality of gear ratios between said shafts and means responsive to relative rotation of said shafts in one direction for preventing movement of said shiftable means for the establishment of a desired gear ratio and responsive to a reversal of said relative movement of said shafts to permit gear ratio establishing movement of said shiftable means, fluid pressure operated gear shifting mechanism for selecting and establishing desired gear ratios including an element movable to select and shiftable to establish said ratios, means including a manually operable control valve mechanism for energizing said fluid pressure gear shifting mechanism to select and establish a desired gear ratio, a brake associated with one of the transmission shafts for reversing the relative direction of rotation of said shafts for permitting operation of the fluid pressure gear changing mechanism to establish a desired gear ratio, and a fluid motor for actuating said brake, of means responsive to a predetermined pressure in the intake manifold of the engine for controlling the supplying of fluid pressure to said fluid motor for actuating said brake for reversing the relative direction of rotation of said one shaft and permitting movement of the shiftable element by the fluid pressure gear shifting mechanism for engaging a desired gear ratio, and means actuated during movement of the shiftable element from neutral position for insuring deenergization of said fluid motor and subsequent unretarded rotation of said one shaft regardless of the action of said intake manifold pressure responsive means.

14. The combination in a motor vehicle having an engine provided with an intake manifold, a transmission of the type having an input shaft driven by the engine and an output shaft for driving the vehicle and having means shiftable for establishing different gear ratios between said shafts and means controlled by the relative direction of movement of said shafts in one direction for preventing engagement of the shiftable means from neutral position and operable by a reversal in the relative direction of movement of said shafts for permitting engagement of the shiftable means from neutral position, means for shifting the shiftable means to and from neutral position, a brake associated with said input shaft and power means for operating said brake whereby on application thereof the relative direction of rotation of said transmission shafts is reversed, means responsive to a high degree of vacuum in the intake manifold of the engine for controlling the supplying of power to said brake to effect said reversal of direction to permit said engagement of the shiftable means and responsive to a normal degree of vacuum in the intake manifold of the engine for preventing the application of power to said brake, and means controlled by the movement of the shifting means from neutral position to gear-engaged position for preventing the application of power to said brake by said vacuum controlled means.

15. The combination in a motor vehicle having an engine provided with an intake manifold, a transmission having means shiftable to establish a plurality of gear ratios, means for shifting said shiftable means to select and establish a desired gear ratio, a clutch interposed between the engine and the transmission for transmitting power from the engine to the transmission having a member connected with the engine and a member connected with the transmission and having a clutch brake operable for retarding the motion of the clutch member connected to the transmission, and an actuator for said clutch brake, of means controlled by the pressure in the intake manifold for controlling energizing and deenergizing of said clutch brake actuator, means controlled by operation of the gear shifting means for preventing or permitting energization and deenergization of the clutch brake actuator by said manifold pressure control means, and operator-controlled means for controlling the energization and deenergization of said clutch brake actuator independently of the controlling action of said manifold pressure responsive means and said means controlled by the operation of the gear shifting means.

16. The combination in a vehicle having an engine provided with an intake manifold, a variable ratio transmission of the type having input and output shafts and shiftable means for establishing different gear ratios therebetween, means responsive to changes in the relative direction of rotation of said shafts for preventing or permitting shifting movement of said means, a clutch for transmitting power from said engine to said transmisssion including a member driven by the engine and a member connected to the input shaft and adapted to be driven by the engine driven member, a clutch brake associated with said input shaft for varying the relative rotational position of said shaft with respect to said output shaft, and a fluid motor for actuating said brake, of an element for shifting said shiftable means to establish a desired gear ratio, a source of fluid pressure, and means including a valve responsive to the pressure in the intake manifold for supplying fluid pressure to said motor from said source whereby the clutch brake is actuated to change the relative rotational position of said shafts to permit operation of said element to establish a desired gear ratio.

17. The combination in a vehicle having an engine provided with an intake manifold, a variable ratio transmission having shiftable means for establishing different gear ratios, a clutch having a member driven by the engine and a member connected to the transmission for transmitting power from the engine to the transmission, a clutch brake for controlling the operation of one of said clutch members and facilitating the operation of said shiftable means in engaging a desired gear ratio, and fluid pressure operated means for actuating said clutch brake, of means including a valve having an element responsive to the pressure in the intake manifold for controlling the pressure of the fluid in said clutch brake motor.

18. The combination in a vehicle having an engine provided with an intake manifold, a transmission of the type having input and output shafts, shiftable means for establishing different gear ratios between said input and output shafts, and means responsive to relative changes in the direction of rotation of said shafts for permitting or preventing the operation of said shiftable means to engage a desired gear ratio, and a clutch for transmitting power from said engine to said transmission including a member driven by the engine and a member connected with the input shaft, of a brake associated with said input shaft for controlling the rotational position thereof, a fluid motor for actuating said brake, and means including a valve having an element responsive to the pressure in the intake manifold for supplying fluid pressure to said motor when the pressure in the intake manifold is less than a predetermined value.

19. The combination in a motor vehicle having a source of power, a variable ratio transmission for transmitting power to the driving mechanism of the vehicle, a clutch having driving and driven parts for transmitting power from the source to the transmission and a clutch brake for retarding rotation of the driven clutch part, of operator-controlled means for selecting and controlling the establishment of a reverse and forward gear ratios in the transmission, a second operator-controlled means for controlling the actuation of said clutch brake, means for normally preventing the operation of said first named operator-controlled means to select and establish said reverse gear ratio, and means controlled by and operable on operation of said second named operator-controlled means to effect actuation of the clutch brake for rendering said preventing means ineffective to prevent operation of said first named operator-controlled means to select and establish said reverse gear ratio.

20. In a transmission mechanism for motor vehicles embodying an internal combustion engine having a throttle, a fluid fly wheel including impeller and runner elements, a transmission gearing including input and output shafts and change-speed gearing between them including selectively operable clutches shiftable from neutral into engaged position and embodying means for blocking engagement of the clutches until the speeds of the parts to be clutched together cross, and a brake operable to retard and also stop and also reverse the input shaft to unlock the balking means; the combination of a pressure operated motor to apply the brake, a source of pressure fluid, a conduit system connecting the source and said motor, valves in the conduit system including a pressure reducing valve and a vacuum operated, differential means operated by vacuum controlled by the throttle position and operable to open and close the pressure reducing valve, and a cut-out valve operable by the shifting of the selected clutch from neutral and normally open when the clutches are in neutral.

WILLIAM J. ANDRES.